(12) United States Patent
Paz et al.

(10) Patent No.: US 11,588,579 B2
(45) Date of Patent: Feb. 21, 2023

(54) INTERLEAVING BASED ON CODE BLOCK GROUPS FOR A WIRELESS COMMUNICATION SYSTEM

(71) Applicant: QUALCOMM Incorporated, San Diego, CA (US)

(72) Inventors: Daniel Paz, Geva Carmel (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 17/323,393

(22) Filed: May 18, 2021

(65) Prior Publication Data

US 2022/0376825 A1    Nov. 24, 2022

(51) Int. Cl.
| | |
|---|---|
| *H04L 1/00* | (2006.01) |
| *H04L 1/18* | (2006.01) |
| *H04L 1/1829* | (2023.01) |
| *H04L 1/1867* | (2023.01) |

(52) U.S. Cl.
CPC .......... *H04L 1/0071* (2013.01); *H04L 1/0063* (2013.01); *H04L 1/0078* (2013.01); *H04L 1/1835* (2013.01); *H04L 1/1841* (2013.01); *H04L 1/1874* (2013.01)

(58) Field of Classification Search
CPC ... H04L 1/0071; H04L 1/0063; H04L 1/0078; H04L 1/1835; H04L 1/1841; H04L 1/1874

See application file for complete search history.

(56) References Cited

U.S. PATENT DOCUMENTS

| | | | | |
|---|---|---|---|---|
| 10,944,512 | B2 * | 3/2021 | Gupta | H04L 1/08 |
| 11,368,264 | B2 * | 6/2022 | Ma | H04L 5/0046 |
| 2018/0368113 | A1 * | 12/2018 | Gupta | H04L 1/0072 |
| 2020/0120693 | A1 * | 4/2020 | Wu | H04W 72/1263 |
| 2020/0304251 | A1 * | 9/2020 | Pinayour Chandrasekaran | H04L 1/1809 |

FOREIGN PATENT DOCUMENTS

WO    WO2018228600 A1 * 12/2018 ........... H04L 5/0005

OTHER PUBLICATIONS

F. A. P. de Figueiredo, K. G. Lenzi, J. A. B. Filho and F. L. Figueiredo, "LTE-Advanced channel coding generic procedures A high-level model to guide low-level implementations," 2013 Wireless Telecommunications Symposium (WTS), Phoenix, AZ, USA, 2013, pp. 1-7. (Year: 2013).*

* cited by examiner

*Primary Examiner* — Cynthia Britt
(74) *Attorney, Agent, or Firm* — Norton Rose Fulbright LLP

(57) ABSTRACT

An apparatus for wireless communication includes a transmitter and a receiver. The receiver is configured to receive a first code block (CB) that is associated with a code block group (CBG) and that is included in a transport block (TB). The receiver is further configured to receive a second CB that is associated with the CBG and that is included in the TB. The first CB is distinct from the second CB. The second CB includes at least a first bit that is associated with the first CB.

30 Claims, 6 Drawing Sheets

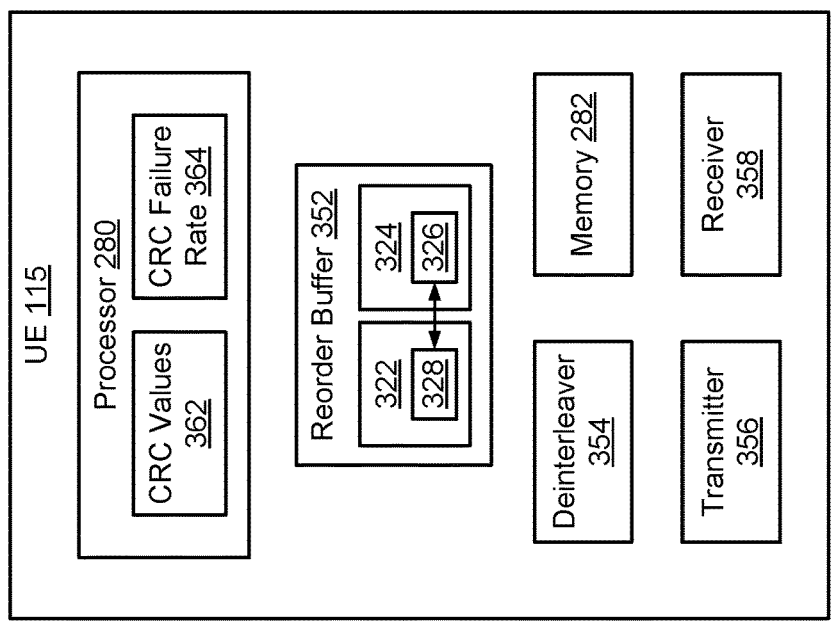
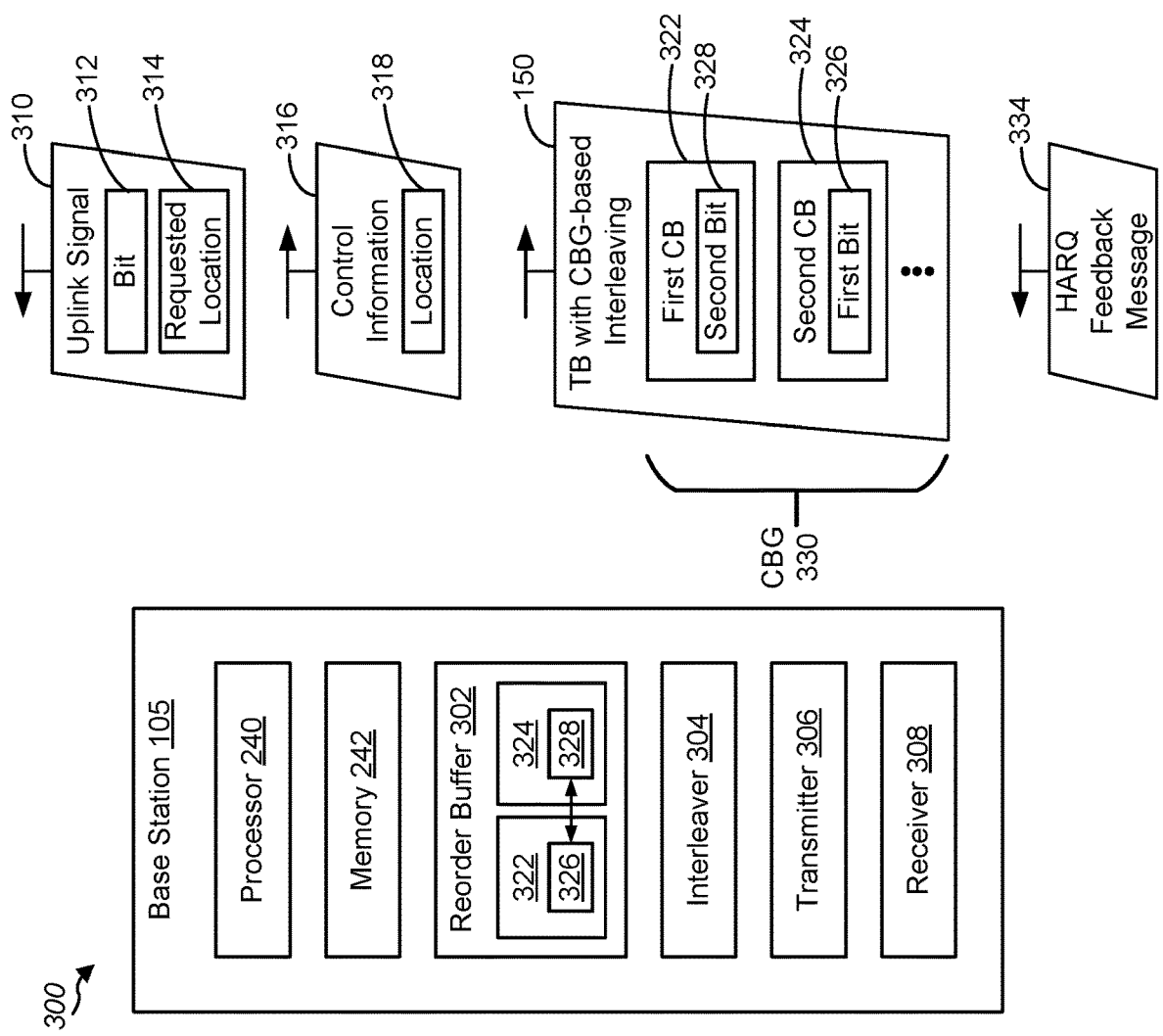
FIG. 3

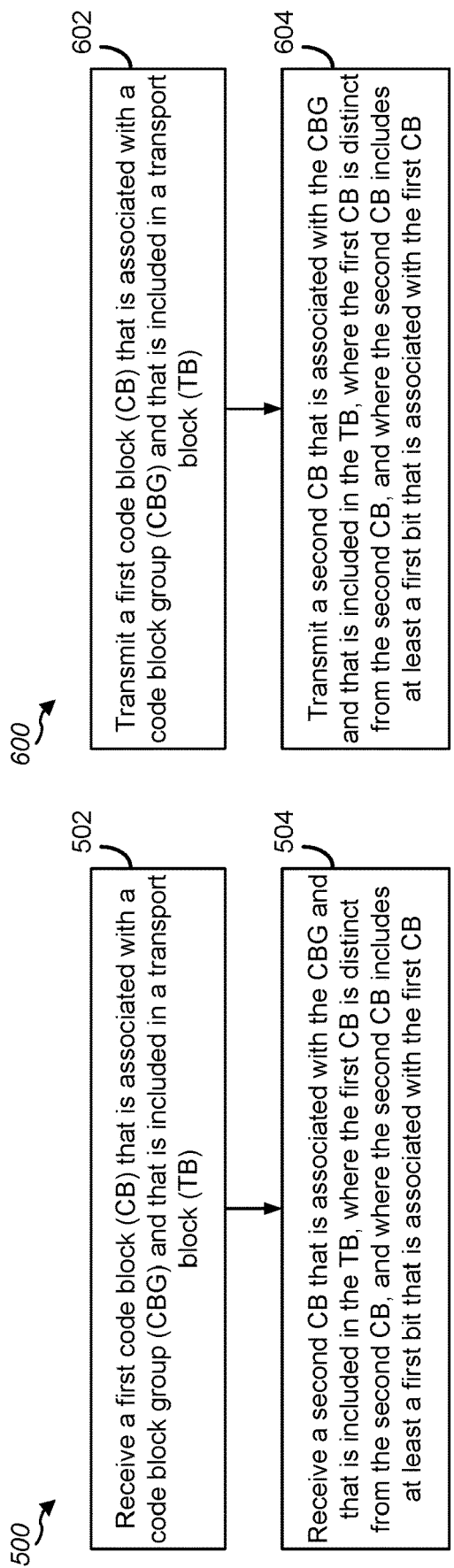

INTERLEAVING BASED ON CODE BLOCK GROUPS FOR A WIRELESS COMMUNICATION SYSTEM

TECHNICAL FIELD

Aspects of the present disclosure relate generally to wireless communication systems, and more particularly, to wireless communication systems that use code blocks (CBs) to communicate data.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, an apparatus for wireless communication includes a transmitter and a receiver. The receiver is configured to receive a first code block (CB) that is associated with a code block group (CBG) and that is included in a transport block (TB). The receiver is further configured to receive a second CB that is associated with the CBG and that is included in the TB. The first CB is distinct from the second CB. The second CB includes at least a first bit that is associated with the first CB.

In some other aspects of the disclosure, a method of wireless communication includes receiving a first CB that is associated with a CBG and that is included in a TB. The method further includes receiving a second CB that is associated with the CBG and that is included in the TB. The first CB is distinct from the second CB. The second CB includes at least a first bit that is associated with the first CB.

In some other aspects of the disclosure, an apparatus for wireless communication includes a receiver and a transmitter. The transmitter is configured to transmit a first CB that is associated with a CBG and that is included in a TB. The transmitter is further configured to transmit a second CB that is associated with the CBG and that is included in the TB. The first CB is distinct from the second CB. The second CB includes at least a first bit that is associated with the first CB.

In some other aspects of the disclosure, a method of wireless communication includes transmitting a first CB that is associated with a CBG and that is included in a TB. The method further includes transmitting a second CB that is associated with the CBG and that is included in the TB. The first CB is distinct from the second CB. The second CB includes at least a first bit that is associated with the first CB.

BRIEF DESCRIPTION OF THE DRAWINGS

FIG. 3 is a block diagram illustrating an example of a wireless communication system according to some aspects of the disclosure.

FIG. 5 is a flow diagram illustrating an example of a method of wireless communication by a receiving device according to some aspects of the disclosure.

FIG. 6 is a flow diagram illustrating an example of a method of wireless communication by a transmitting device according to some aspects of the disclosure.

DETAILED DESCRIPTION

Figure 1:
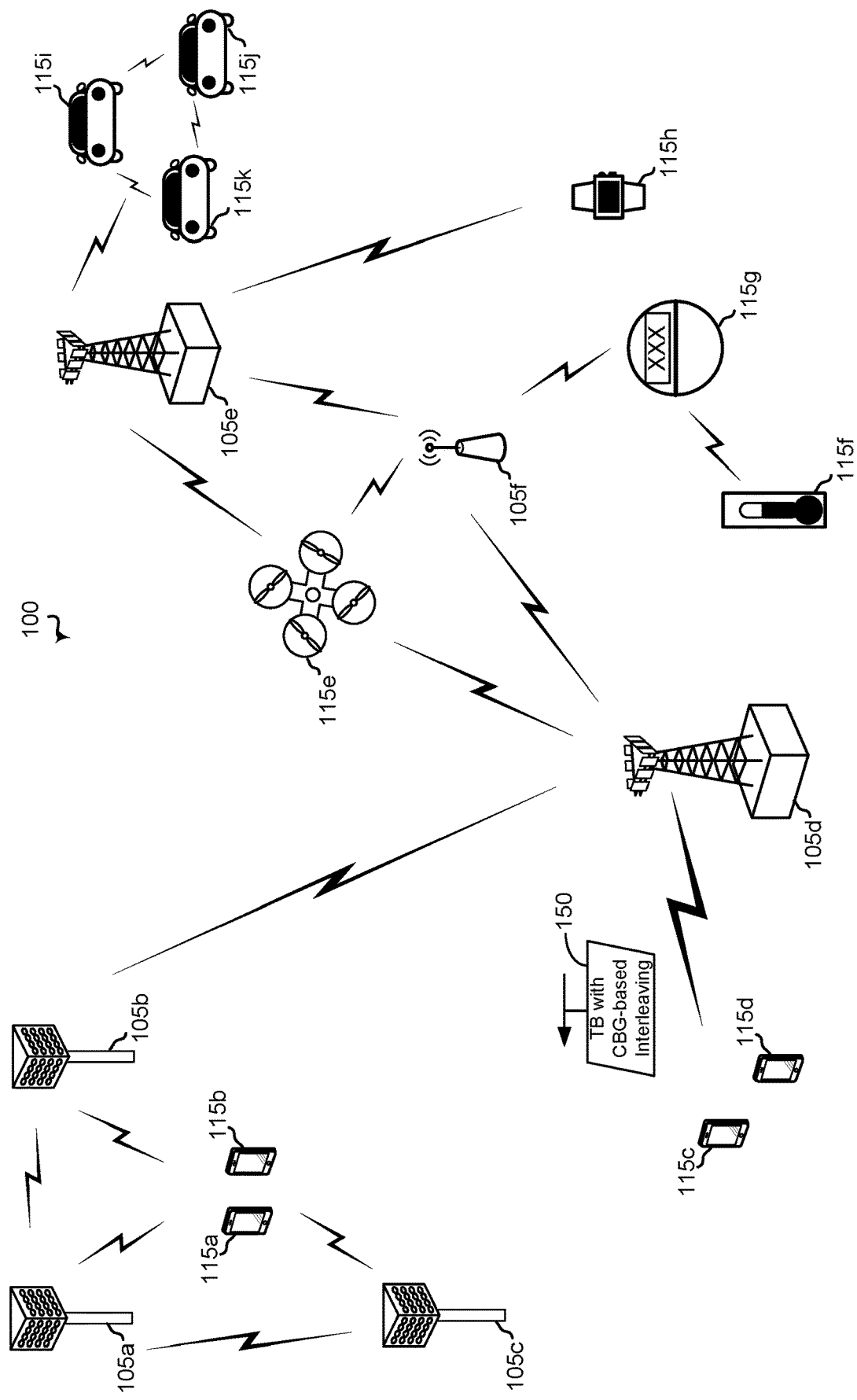
FIG. 1 is a block diagram illustrating an example of a wireless communication system according to some aspects of the disclosure.

Some wireless communication protocols use hybrid automatic repeat request (HARQ) feedback messaging in connection with transmissions. For example, a base station may transmit to a user equipment (UE) a transport block (TB) that includes code blocks (CBs). If the UE is unable to decode one or more CBs of the TB (e.g., due to noise or interference), the UE may transmit a HARQ feedback message indicating non-acknowledgement (NACK) of the one or more CBs. An example of noise or interference may include a frequency "spur" or "notch" that may occur in a particular frequency band in some circumstances. Based on the NACK, the base station may retransmit the one or more CBs to the UE.

Retransmission of CBs uses resources of a wireless communication system and incurs power consumption by devices. To reduce retransmission of CBs, a more robust error correction code may be used, such as by increasing a number of redundancy bits included in a CB. In this case, an amount of data in the CB may be decreased, increasing latency and reducing data throughput and performance of a wireless communication system.

In some aspects of the disclosure, devices of a wireless communication may perform interleaving and deinterleaving on a code block group (CBG) basis. In some wireless communication protocols, a CBG may include multiple CBs, and HARQ report messaging may be performed separately for each CBG. In some aspects of the disclosure, one or more bits of at least one CB of a CBG may be interleaved with one or more bits of at least one other CB of the CBG.

In some circumstances, CBG-based interleaving may reduce a number of retransmitted CBs while also reducing or minimizing latency that may potentially result from certain encoding or interleaving techniques. For example, by interleaving bits among CBs of a CBG, spectral diversity of the CBs may be increased as compared to certain other interleaving techniques, such as a "per-CB" interleaving technique that interleaves bits separately within each CB (and not between different CBs). To illustrate, in some aspects of the disclosure, after interleaving first bits of a first CB with second bits of a second CB, a transmitting device may transmit the first CB using both first frequency resources associated with the first CB and second frequency resources associated with the second CB. As a result, if a frequency spur or notch occurs in a frequency band overlapping the first resources, then the second bits may be relatively unaffected by the frequency spur or notch, and a receiving device may use the second bits to error correct the first CB in some cases. In this case, the receiving device may avoid requesting retransmission of the first CB.

Further, CBG-based interleaving may reduce latency as compared to certain other encoding or interleaving techniques. To illustrate, in a CBG-based interleaving technique, bits of one CBG may be eligible for interleaving with bits of the CBG but may be ineligible for interleaving with bits of other CBGs. In some other techniques, such as a TB-based interleaving technique, bits of a CBG may be eligible for interleaving with bits of other CBGs, which may increase latency (due to a longer interleaving pattern, where a receiving device may "wait" longer for more bits to complete deinterleaving). As a result, a CBG-based interleaving technique may reduce a number of retransmitted CBs while also reducing latency that may potentially result from certain encoding or interleaving techniques.

In addition, one or more aspects of the disclosure may "repurpose" (or "leverage") CBGs to indicate interleaving (e.g., instead of using another parameter, in addition to CBGs, to indicate interleaving). For example, certain wireless communication protocols may specify that CBs are to be grouped into CBGs. If an indication of a group size of the CBGs is transmitted to a receiving device, the receiving device may also determine that an interleaving size (e.g., a "chunk" of bits interleaved with one another) corresponds to the group size of the CBGs without receiving an additional message or indication of the interleaving size. As a result, CBG-based interleaving may reduce a number of messages transmitted within a wireless communication system by "repurposing" (or "leveraging") CBGs for interleaving.

Some aspects of the disclosure may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

One or more devices described with reference to FIG. 1 may use code block group (CBG) based interleaving in connection with one or more wireless communications. For example, in FIG. 1, the base station 105d (or another base station) may transmit a transport block (TB) 150 having CBG-based interleaving, and, the UE 115c (or another UE) may receive the TB 150. As referred to herein, "CBG-based" interleaving may refer to interleaving one or more bits from at least one CB of a CBG to one or more other CBs of the same CBG.

Figure 2:
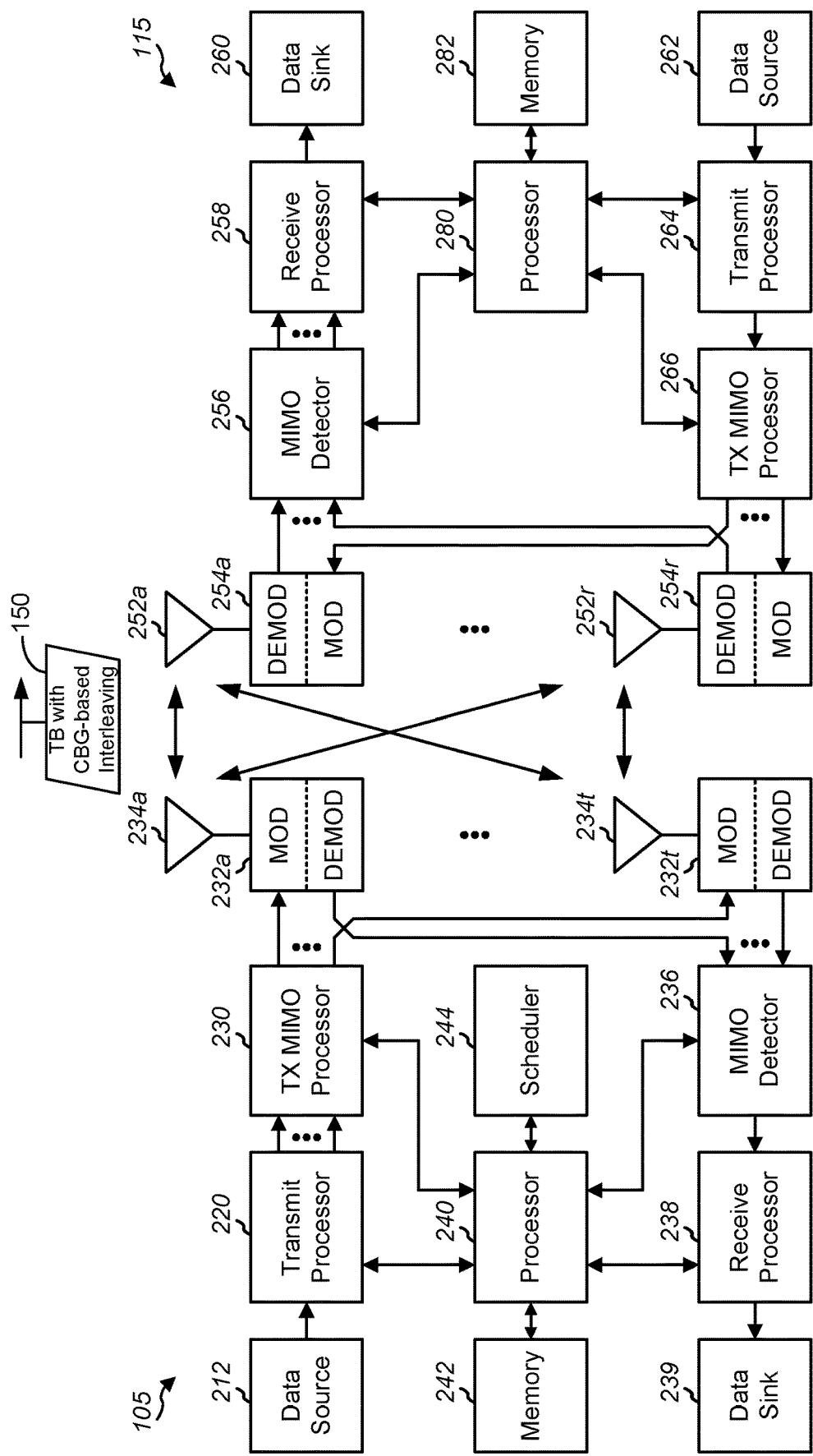
FIG. 2 is a block diagram illustrating examples of a base station and a user equipment (UE) according to some aspects of the disclosure.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from processor 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to processor 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to processor 240.

Processors 240 and 280 may direct the operation at base station 105 and UE 115, respectively. Processor 240 or other processors and modules at base station 105 or processor 280 or other processors and modules at UE 115 may perform or direct the execution of various processes for the techniques described herein, such as to perform or direct the operations illustrated in FIGS. 5 and 6, or other processes for the techniques described herein. For example, the transmit processor 220 or the processor 240 may execute instructions to initiate transmission of the TB 150 by the base station 105, and the receive processor 258 or the processor 280 may execute instructions to control reception of the TB 150 by the UE 115. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum.

For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

FIG. 3 is a block diagram illustrating an example of a wireless communication system 300 according to some aspects of the disclosure. The wireless communication system 300 may include one or more base stations, such as the base station 105. The wireless communication system 300 may further include one or more UEs, such as the UE 115.

The example of FIG. 3 illustrates that the base station 105 may include one or more processors (such as the processor 240) and may include the memory 242. The base station 105 may further include a transmitter 306 and a receiver 308. In the example of FIG. 3, the base station 105 may include a reorder buffer 302 and an interleaver 304. The interleaver 304 may be coupled to the reorder buffer 302. The processor 240 may be coupled to the memory 242, to the transmitter 306, and to the receiver 308. In some examples, the reorder buffer 302 and the interleaver 304 are coupled to or included in the processor 240 or the transmit processor 264. In some examples, the interleaver 304 includes a control circuit, such as a multiplexer (MUX) circuit).

In some examples, the transmitter 306 and the receiver 308 include one or more components described with reference to FIG. 2, such as one or more of the modulator/demodulators 232a-t, the MIMO detector 236, the receive processor 238, the transmit processor 220, or the TX MIMO processor 230. In some implementations, the transmitter 306 and the receiver 308 may be integrated in one or more transceivers of the base station 105.

The transmitter 306 may be configured to transmit reference signals, synchronization signals, control information, and data to one or more other devices, and the receiver 308 may be configured to receive reference signals, control information, and data from one or more other devices. For example, the transmitter 306 may be configured to transmit signaling, control information, and data to the UE 115, and the receiver 308 may be configured to receive signaling, control information, and data from the UE 115.

FIG. 3 also illustrates that the UE 115 may include one or more processors (such as the processor 280), a memory (such as the memory 282), a transmitter 356, and a receiver 358. In the example of FIG. 3, the UE 115 may include a reorder buffer 352 and a deinterleaver 354. The deinterleaver 354 may be coupled to the reorder buffer 352. The processor 280 may be coupled to the memory 282, to the transmitter 356, and to the receiver 358. In some examples, the reorder buffer 352 and the deinterleaver 354 are coupled to or included in the processor 280 or the receive processor 258.

In some examples, the deinterleaver 354 includes a control circuit, such as a MUX circuit.

In some examples, the transmitter 356 and the receiver 358 may include one or more components described with reference to FIG. 2, such as one or more of the modulator/demodulators 254a-r, the MIMO detector 256, the receive processor 258, the transmit processor 264, or the TX MIMO processor 266. In some implementations, the transmitter 356 and the receiver 358 may be integrated in one or more transceivers of the UE 115.

The transmitter 356 may be configured to transmit reference signals, synchronization signals, control information, and data to one or more other devices, and the receiver 358 may be configured to receive reference signals, control information, and data from one or more other devices. For example, in some implementations, the transmitter 356 may be configured to transmit signaling, control information, and data to the base station 105, and the receiver 358 may be configured to receive signaling, control information, and data from the base station 105.

In some implementations, one or more of the transmitter 306, the receiver 308, the transmitter 356, or the receiver 358 may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some implementations, the wireless communication system 300 operates in accordance with a 5G NR network. For example, the wireless communication system 300 may include multiple 5G-capable UEs 115 and multiple 5G-capable base stations 105, such as UEs and base stations configured to operate in accordance with a 5G NR network protocol such as that defined by the 3GPP.

During operation, the base station 105 and the UE 115 may transmit and receive data, reference signals, and other messages. For example, the base station 105 may transmit data to the UE 115 via one or more downlink channels. In some examples, the data may be transmitted in one or more TBs, such as the TB 150. A transport block may include one or more CBs, and each CB may be associated with or may include respective cyclic redundancy check (CRC) information that enables the UE 115 to detect an error associated with the CB. For example, the TB 150 may include a first CB 322 including first CRC information and a second CB 324 including second CRC information. One or more CBs may be associated with a code block group (CBG), where hybrid automatic repeat request (HARQ) feedback and retransmissions may be performed on a per-CBG basis. For example, the first CB 322 and the second CB 324 may be associated with a CBG 330.

In some aspects of the disclosure, one or more bits of a CB of a CBG may be interleaved with one or more other CBs of the CBG, which may increase spectral efficiency and HARQ efficiency in some circumstances as compared to certain other techniques (such as techniques that interleave bits within a CB independently of each other CB). To illustrate, prior to transmitting the TB 150, the base station 105 may interleave bits of at least some CBs of the CBG 330, such as by interleaving a first bit 326 of the first CB with a second bit 328 of the second CB 324. In some implementations, the base station 105 stores the CBs 322, 324 to the reorder buffer 302, and the interleaver 304 interleaves the bits 326, 328. For example, the interleaver 304 may move the first bit 326 from the first CB 322 to the second CB 324 to generate an interleaved version of the first CB 322 and may move the second bit 328 from the second CB 324 to the first CB 322 to generate an interleaved version of the second CB 324.

After interleaving the TB 150, the base station 105 may transmit the TB 150. For example, the base station 105 may provide the TB 150 to the transmitter 306 for transmission to the UE 115. The transmitter 306 may transmit the TB 150 to the UE 115 via one or more wireless communication channels, such as via a physical downlink shared channel (PDSCH), as an illustrative example. The TB 150 may include interleaved versions of TBs generated using the reorder buffer 302 and the interleaver 304, such as the interleaved version of the first CB 322 and the interleaved version of the second CB 324.

The UE 115 may receive the TB 150 and may deinterleave the TB 150. For example, the UE 115 may store the TB 150 at the reorder buffer 352, and the deinterleaver 354 may deinterleave the bits 326, 328. To further illustrate, the deinterleaver 354 may move the first bit 326 from the second CB 324 to the first CB 322 to generate a deinterleaved version of the first CB 322 and may move the second bit 328 from the first CB 322 to the second CB 324 to generate a deinterleaved version of the second CB 324.

After deinterleaving at least some CBs of the CBG 330, the UE 115 may perform a CRC verification operation associated with the CBG 330. For example, the CBG 330 may determine a CRC value (which may be added to or included in CRC values 362) based on bits of CBs of the CBG 330 and may compare the CRC value to a CRC reference value. In some examples, one or more bit errors associated with the bits may cause the CRC value to differ from the CRC reference value, or a number of the one or more bit errors may exceed an error correction capability associated with an error correction code used to encode the bits. In this case, the UE 115 may transmit a hybrid automatic repeat request (HARQ) feedback message 334 indicating non-acknowledgement (NACK) of the CBG 330. In response to the HARQ feedback message 334 indicating the NACK, the base station 105 may retransmit the CBG 330. In some other examples, the CRC value may match the CRC reference value, or a number of the one or more bit errors may fail to exceed the error correction capability associated with the error correction code used to encode the bits. In this case, the HARQ feedback message 334 transmitted by the UE 115 may indicate acknowledgement (ACK) of the CBG 330.

In some examples, a storage capacity of one or both of the reorder buffers 302, 352 is based on a data size associated with the CBG 330. For example, in some implementations, a storage capacity of one or both of the reorder buffers 302, 352 is greater than or equal to a data size of the CBG 330. In such examples, the storage capacity may enable the interleaver 304 to interleave bits of CBs of the CBG 330 in parallel and may enable the deinterleaver 354 to deinterleave bits of CBs of the CBG 330 in parallel.

In some examples, the base station 105 initiates CBG-based interleaving based on one or more channel estimation parameters. As illustrative examples, the one or more channel estimation parameters may include a delay spread of one or more received signals exceeding a threshold, a Doppler spread of one or more received signals exceeding a threshold, a received demodulation reference signal (DMRS) pattern differing from a reference DMRS pattern by a threshold amount, a signal strength parameter (such as a signal-to-noise ratio (SNR) or a signal-to-noise-plus-interference ratio (SINR)) of one or more received signals failing to exceed a threshold, one or more other parameters, or a combination thereof. The base station 105 may transmit a message indicating activation of CBG-based interleaving based on one or more channel estimation parameters, and the UE 115 may receive the message. In some examples, the message corresponds to one of a downlink control information (DCI) message, a medium access control (MAC) control element (MAC-CE) message, or a radio resource control (RRC) configuration message, as illustrative examples. In some examples, the base station 105 transmits the message to the UE 115 prior to transmitting the TB 150 to the UE 115.

Alternatively or in addition, the UE 115 may transmit a request for the base station 105 to enable CBG-based interleaving. The request may include or correspond to an indication of a capability of the UE 115 to perform CBG-based interleaving. As an illustrative example, the indication may specify a data storage capacity of the reorder buffer 352. In some examples, the UE 115 transmits the indication (or request) to the base station 105 prior to receiving the TB 150 from the base station 105.

In some examples, the indication (or request) is included in or corresponds to an uplink signal 310. To illustrate, the uplink signal 310 may correspond to a measurement report (such as a channel state feedback (CSF) report) or uplink control information (UCI) transmitted by the UE 115, as illustrative examples. In some implementations, the request may correspond to a particular value (such as a logic zero value or a logic one value) of a bit 312 that is included in the uplink signal 310. In some examples, the particular value of the bit 312 indicates to the base station 105 to perform CBG-based interleaving, such as by interleaving the bits 326, 328.

In some examples, the UE 115 may request CBG-based interleaving (e.g., by setting the particular value of the bit 312) based on a CRC failure rate 364. For example, the UE 115 may receive, prior to receiving the TB 150, one or more other CBs (which may be included in one or more other TBs) and may determine the CRC failure rate 364 based on the one or more other CBs. In one example, the CRC failure rate 364 corresponds to or is based on a percentage of CBs having CRC values that fail to match a reference CRC value, which may involve retransmission of the CBs. In some such examples, the UE 115 may request or recommend CBG-based interleaving (e.g., by setting the particular value of the bit 312) to reduce the CRC failure rate 364.

In some aspects, a CBG having CBG-based interleaving may be referred to herein as an interleaved region. Further, a TB may optionally include one or more non-interleaved regions. Thus, in some cases, the TB 150 may include one or more interleaved regions (such as the CBG 330) and may optionally include one or more non-interleaved regions.

In some implementations, the UE 115 may request a particular location of an interleaved region of the TB 150. For example, the uplink signal 310 may include an indication of a requested location 314 of the at least one interleaved region within the TB 150, and the at least one interleaved region may include or correspond to the CBG 330. Alternatively or in addition, the base station 105 may provide the UE 115 an indication of a location of at least one interleaved region within the TB 150. For example, the base station 105 may transmit control information 316 to the UE 115 indicating a location 318 of at least one interleaved region within the TB 150, where the at least one interleaved region includes or corresponds to the CBG 330. In some examples, the control information 316 is included in one of a downlink control information (DCI) message, a medium access control (MAC) control element (MAC-CE) message, or a radio resource control (RRC) configuration message. In some implementations, the control information 316 indicates the location 318 relative to a second interleaved region within the TB 150, as described further with reference to the example of FIG. 4.

Figure 4:
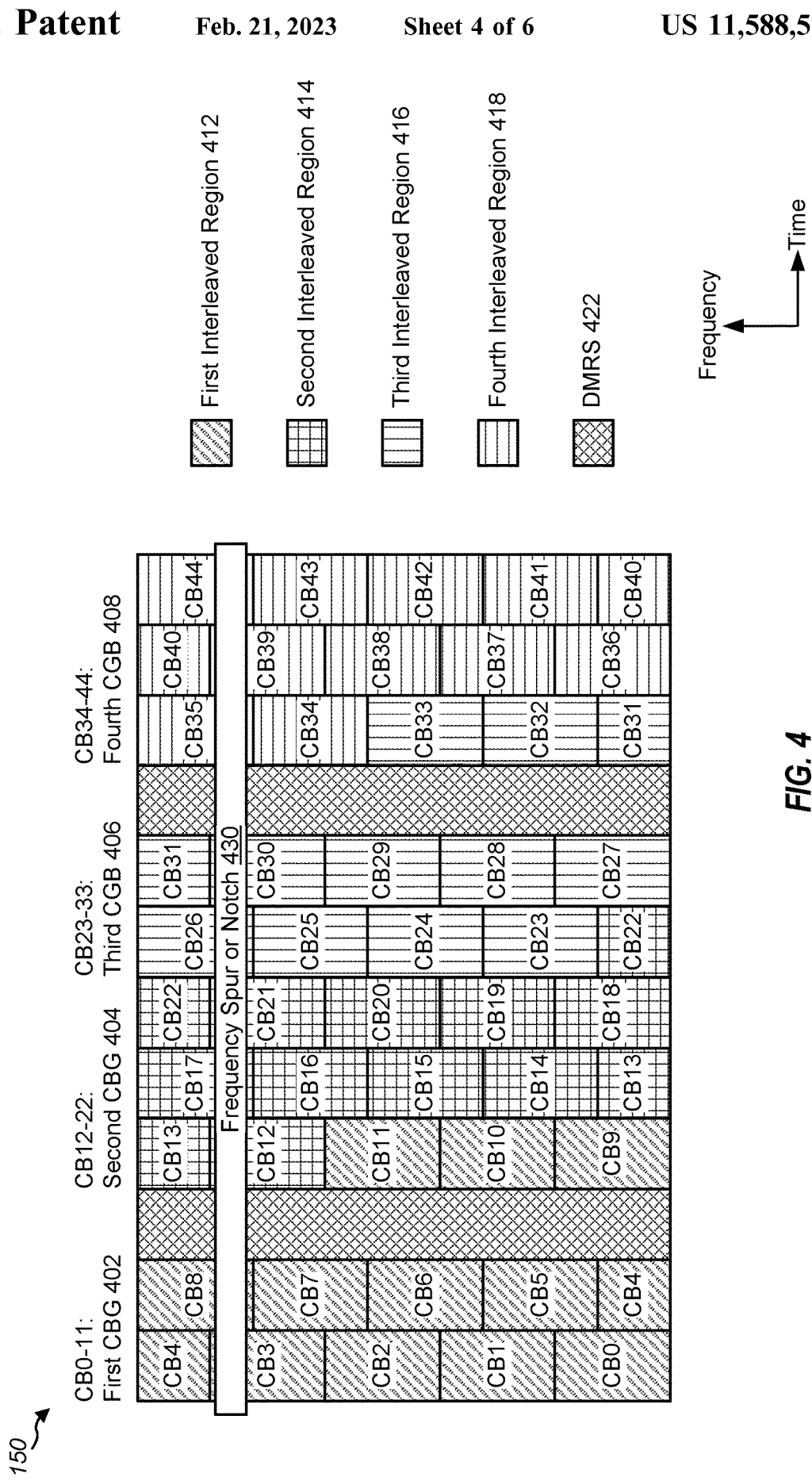
FIG. 4 is a diagram illustrating certain features of an example of a transport block (TB) according to some aspects of the disclosure.

FIG. 4 is a diagram illustrating certain features of an example of the TB 150 according to some aspects of the disclosure. In FIG. 4, the abscissa may indicate time (such as OFDM time symbols), and the ordinate may indicate frequency (such as frequency resource elements).

In the example of FIG. 4, the TB 150 may be associated with multiple CBGs, such as a first CBG 402, a second CBG 404, a third CBG 406, and a fourth CBG 408. Each CBG may include one or more CBs. For example, the first CBG 402 may include CB0-11, and the second CBG 404 may include CB12-22. As additional examples, the third CBG 406 may include CB23-33, and the fourth CBG 408 may include CB34-44. In some implementations, a CB may be "split" between multiple time resources. For example, CB4 may be "split" between a first OFDM time symbol and a second OFDM time symbol.

In some examples, one of the CBGs 402, 404, 406, and 408 may correspond to the CBG 330 of FIG. 3, and two CBs of a CBG illustrated in FIG. 4 may correspond to the CBs 322, 324 of FIG. 3. To illustrate, in one example, CB0 may correspond to the first CB 322, and CB1 may correspond to the second CB 324. In another example, CB7 may correspond to the first CB 322, and CB2 may correspond to the second CB 324. In another example, CB41 may correspond to the first CB 322, and CB43 may correspond to the second CB 324. Other examples are also within the scope of the disclosure.

In FIG. 4, each CBG of the TB 150 may correspond to a respective interleaved region that is interleaved independently of other CBGs of the TB 150. For example, the first CBG 402 may correspond to a first interleaved region 412, the second CBG 404 may correspond to a second interleaved region 414, the third CBG 406 may correspond to a third interleaved region 416, and the fourth CBG 408 may correspond to a fourth interleaved region 418.

In some implementations, certain resources associated with the TB 150 may be used to transmit one or more reference signals, such as a DMRS 422. For example, an OFDM symbol following transmission of CB4-8 may be used to transmit the DMRS 422. As another example, another OFDM symbol following transmission of CB27-30 (and part of CB31) may be used to transmit the DMRS 422.

The TB 150 may include a particular number of interleaved regions that are separately interleaved from one another, and the particular number of interleaved regions may correspond to a number of CBGs associated with the TB 150. To illustrate, in the example of FIG. 4, the TB 150 includes four CBGs and four interleaved regions. In some other examples, one or more CBGs of the TB 150 may not be interleaved (or may be subject to another interleaving technique other than CBG-based interleaving). As an illustrative example, the first CBG 402 may be interleaved using a CBG-based technique (e.g., by "swapping" the bits 326, 328 as described with reference to FIG. 3), and the second CBG 404 may not be interleaved or may be subject to another interleaving technique other than CBG-based interleaving.

In some implementations, the requested location 314 of FIG. 3 indicates one or more of the interleaved regions 412, 414, 416, or 418. As an illustrative example, the UE 115 may request, by indicating the requested location 314, the base station 105 to apply CBG-based interleaving to the first CBG 402 to produce the first interleaved region 412.

Alternatively or in addition, the base station 105 may specify one or more interleaved regions of the TB 150 via by indicating the location 318 of FIG. 3. For example, the control information 316 may correspond to a response to the uplink signal 310. As an illustrative example, the UE 115 may request, by indicating the requested location 314, the base station 105 to apply CBG-based interleaving to the first CBG 402 to produce the first interleaved region 412, and the base station may accept the request by indicating the first CBG 402 by indicating the location 318. In this case, the requested location 314 may correspond to the location 318 indicated by the control information 316. In other examples, the requested location 314 may differ from the location 318, such as if the base station 105 has completed processing (e.g., one or more of buffering, encoding, or transcoding) of CBs of the first CBG 402 prior to receiving the uplink signal 310. In some examples, the base station 105 may optionally avoid transmitting the control information 316 (or may avoid indicating the location 318), such as in response to determining to avoid performing CBG-based interleaving.

In some examples, one or both of the uplink signal 310 or the control information 316 may indicate a particular location of at least one interleaved region within the TB 150 relative to a second interleaved region within the TB 150. For example, one or both of the requested location 314 or the location 318 may indicate or correspond to an offset from an initial CBG of the TB 150 (such as the first CBG 402). As an example, if the requested location 314 indicates or corresponds to a value of zero, then the at least one interleaved region within the TB 150 may correspond to the first CBG 402 (based on an offset of zero from the first CBG 402). As an additional example, if the location 318 indicates or corresponds to a value of two, then the at least one interleaved region within the TB 150 may correspond to the third CBG 406 (based on an offset of two from the first CBG 402).

During operation, one or more CBs of the TB 150 may be subject to noise or interference In some circumstances. For example, in FIG. 4, a frequency spur or notch 430 may interfere with frequency resources associated with CB3, CB8, CB12, CB17, CB21, CB26, CB30, CB35, and CB39. By performing CBG-based interleaving of bits of CB3, CB8, CB12, CB17, CB21, CB26, CB30, CB35, and CB39, certain effects of the frequency spur or notch 430 may be reduced or mitigated. As an illustrative example, bits of CB3 and CB8 may be interleaved with bits of other CBs of the first CBG 402, such as any of CB0-2, CB4-7, and CB9-11. As a result, after deinterleaving CB3 and CB8, a number of bit errors associated with CB3 and CB8 may be within an error correction capability associated with an error correction coding technique used to encode CBs of the first CBG 402. In this case, the UE 115 may transmit a HARQ feedback message 334 indicating ACK of the CBG 330 (instead of transmitting a HARQ feedback message 334 indicating NACK of the CBG 330 and requesting retransmission of the HARQ feedback message 334).

Further, in some implementations, the UE 115 may transmit a separate HARQ feedback message 334 for each CBG of the TB 150. For example, the base station 105 and the UE 115 may communicate based on a mode of operation or based on a wireless communication protocol that specifies that the UE 115 is to transmit a separate HARQ feedback message 334 on a per-CBG basis.

In some other examples, the base station 105 may communicate with the UE 115 based on a mode in which CBGs are not configured or not enabled for the TB 150, such as in connection with a "legacy" wireless communication protocol that does not support use of CBGs. In such examples, interleaving may be performed on a "fractional" basis. For example, an interleaved region of the TB 150 may span a portion (but not all) of the TB 150. In some examples, a fractional size of the interleaving may correspond to a size of a CBG (even though use of CBGs may be disabled or not configured). As a result, in some implementations, CBG-based interleaving may be performed irrespective of whether use of CBGs is enabled or configured, which may be referred to as "decoupling" of CBG-based interleaving from CBG enabling. Further, in some aspects, the UE 115 may request locations of "fractional" interleaved regions of the TB 150 (e.g., via an indication of the requested location 314 included in the uplink signal 310). Alternatively or in addition, the base station 105 may indicate locations of "fractional" interleaved regions of the TB 150 (e.g., via an indication of the location 318 included in the control information 316).

Although the example of FIG. 4 depicts that the TB 150 includes multiple interleaving regions (and multiple CBGs), other examples are also within the scope of the disclosure. For example, the TB 150 may include a single interleaving region (and a single CBG). In some implementations, an interleaving latency associated with interleaving and deinterleaving CBs on a CBG basis may be determined by adjusting a number of interleaving regions of the TB 150. For example, to decrease the interleaving latency, the number of interleaving regions may be increased, which may decrease an amount of processing time and resources used to interleave and deinterleave bits of CBs of the TB 150. To further illustrate, the base station 105 or the UE 115 may increase the number of interleaving regions during a high-priority or high-throughput communication session. In some other examples, the number of interleaving regions may be decreased (e.g., in the case of a single interleaving region), which may increase an amount of processing time and resources used to interleave and deinterleave bits of CBs of the TB 150. In some circumstances, increasing the number of interleaving regions may increase communication reliability (e.g., by increasing spectral diversity associated with CBs), which may be advantageous in some applications, such as a high-reliability communication session or a low-priority communication session.

Although certain examples have been described with reference to CBG-based interleaving and CBG-based deinterleaving of a downlink transmission (e.g., the TB 150), other examples are also within the scope of the disclosure. For example, in some implementations, the UE 115 may perform CBG-based interleaving of bits an uplink transmission, and the base station 105 may perform CBG-based deinterleaving of the bits after receiving the uplink transmission. As another example, UEs 115 may perform CBG-based interleaving and CBG-based deinterleaving in connection with sidelink communications. For example, one UE 115 may perform CBG-based interleaving of bits a sidelink transmission, and another UE 115 may perform CBG-based deinterleaving of the bits after receiving the sidelink transmission.

Although certain interleaving techniques have been described for illustration, other interleaving techniques are also within the scope of the disclosure. To illustrate, certain examples have been described with reference to "swapping" pairs of bits, such as by replacing the first bit 326 with the second bit 328 and vice versa. In some other interleaving techniques, instead of moving the second bit 328 to the first CB 322 as described with reference to the example of FIG. 3, the second bit 328 may by moved to a CB other than the first CB 322, such as a third CB of the CBG 330, as an illustrative example.

One or more aspects described herein may improve performance of a wireless communication system. For example, in some circumstances, CBG-based interleaving may reduce a number of retransmitted CBs while also reducing or minimizing latency that may potentially result from certain encoding or interleaving techniques. To illustrate, by interleaving bits among CBs of the CBG 330, spectral diversity of the CBs may be increased as compared to certain other interleaving techniques, such as a "per-CB" interleaving technique that interleaves bits separately within each CB (and not between different CBs). As an example, after interleaving the first bit 326 with the second bit 328, the base station 105 may transmit the first CB 322 using both first frequency resources associated with the first CB 322 and second frequency resources associated with the second CB 324. As a result, if the frequency spur or notch 430 occurs in a frequency band overlapping the first resources, and if the second resources are relatively unaffected by the frequency spur or notch 430, the UE 115 may use the second bit 328 to error correct the first CB 322 in some cases. In this case, the UE 115 may avoid requesting retransmission of the first CB 322.

Further, CBG-based interleaving may reduce latency as compared to certain other encoding or interleaving techniques. To illustrate, in a CBG-based interleaving technique, bits of one CBG may be eligible for interleaving with bits of the CBG but may be ineligible for interleaving with bits of other CBGs. In some other techniques, such as a TB-based interleaving technique, bits of a CBG may be eligible for interleaving with bits of other CBGs, which may increase latency (due to a longer interleaving pattern, where the UE 115 may "wait" longer for more bits to complete deinterleaving). As a result, a CBG-based interleaving technique may reduce a number of retransmitted CBs while also reducing latency that may potentially result from certain encoding or interleaving techniques.

In addition, one or more aspects of the disclosure may "repurpose" (or "leverage") CBGs to indicate interleaving (e.g., instead of using another parameter, in addition to CBGs, to indicate interleaving). For example, certain wireless communication protocols may specify that CBs are to be grouped into CBGs. If an indication of a group size of the CBGs is transmitted to the UE 115, the UE 115 may also determine that an interleaving size (e.g., a "chunk" of bits interleaved with one another) corresponds to the group size of the CBGs without receiving an additional message or indication of the interleaving size. As a result, CBG-based interleaving may reduce a number of messages transmitted within a wireless communication system by "repurposing" (or "leveraging") CBGs for interleaving.

FIG. 5 is a flow chart illustrating an example of a method 500 of wireless communication by a receiving device according to some aspects of the disclosure. In some aspects, the method 500 is performed by the UE 115 in connection with communication with the base station 105. Other examples are also within the scope of the disclosure. For example, the method 500 may be performed by the base station 105 in connection with communication with the UE 115. As another example, the method 500 may be performed by the UE 115 in connection with communication with another UE 115.

The method 500 includes receiving a first CB that is associated with a CBG and that is included in a TB, at 502. For example, the UE 115 may receive the first CB 322 associated with the CBG 330 and included in the TB 150. The receiver 358 may be configured to receive the first CB 322.

The method 500 further includes receiving a second CB that is associated with the CBG and that is included in the TB, at 504. The first CB is distinct from the second CB. The second CB includes at least a first bit that is associated with the first CB. For example, the UE 115 may receive the second CB 324 associated with the CBG 330 and included in the TB 150. The first CB 322 is distinct from the second CB 324, and the second CB 324 includes at least the first bit 326 that is associated with the first CB 322. The receiver 358 may be configured to receive the second CB 324.

FIG. 6 is a flow chart illustrating an example of a method 600 of wireless communication by a transmitting device according to some aspects of the disclosure. In some aspects, the method 600 is performed by the base station 105 in connection with communication with the UE 115. Other examples are also within the scope of the disclosure. For example, the method 600 may be performed by the UE 115 in connection with communication with the base station 105. As another example, the method 600 may be performed by the UE 115 in connection with communication with another UE 115.

The method 600 includes transmitting a first CB that is associated with a CBG and that is included in a TB, at 602. For example, the base station 105 may transmit the first CB 322. The first CB 322 may be associated with the CBG 330 and may be included in the TB 150. The transmitter 306 may be configured to transmit the first CB 322.

The method 600 may further include transmitting a second CB that is associated with the CBG and that is included in the TB, at 604. The first CB is distinct from the second CB. The second CB includes at least a first bit that is associated with the first CB. For example, the base station 105 may transmit the second CB 324 associated with the CBG 330 and included in the TB 150. The second CB 324 includes at least the first bit 326 that is associated with the first CB 322. The transmitter 306 may be configured to transmit the second CB 324.

Figure 7:
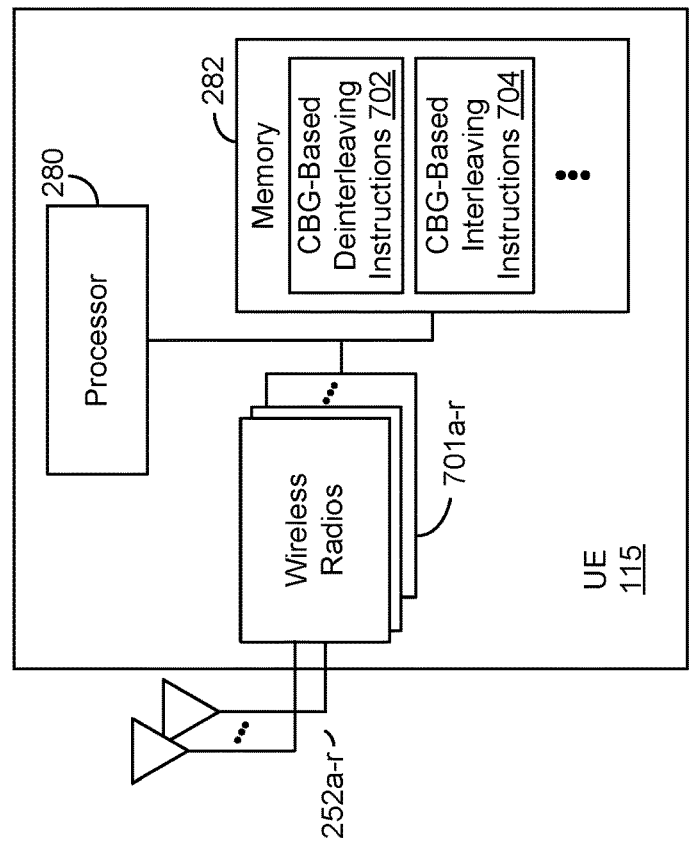
FIG. 7 is a block diagram of an example of a UE according to some aspects of the disclosure.

FIG. 7 is a block diagram illustrating an example of a UE 115 according to some aspects of the disclosure. The UE 115 may include structure, hardware, or components illustrated in FIG. 2. For example, the UE 115 may include the processor 280, which may execute instructions stored in the memory 282. Using the processor 280, the UE 115 may transmit and receive signals via wireless radios 701a-r and antennas 252a-r. The wireless radios 701a-r may include one or more components or devices described herein, such as the modulator/demodulators 254a-r, the MIMO detector 256, the receive processor 258, the transmit processor 264, the TX MIMO processor 266, the transmitter 356, the receiver 358, one or more other components or devices, or a combination thereof.

In some implementations, the memory 282 stores instructions executable by the processor 280 (or by another component of the UE 115) to initiate, perform, or control one or more operations described herein. For example, in some implementations, the memory 282 may store CBG-based deinterleaving instructions 702 executable by the processor 280 to receive the CBs 322, 324 and to deinterleave the CBs 322, 324 using one or more techniques described herein. Alternatively or in addition, the memory 282 may store CBG-based interleaving instructions 704 executable by the processor 280 to interleave CBs for a transmission, such as an uplink transmission or a sidelink transmission.

Figure 8:
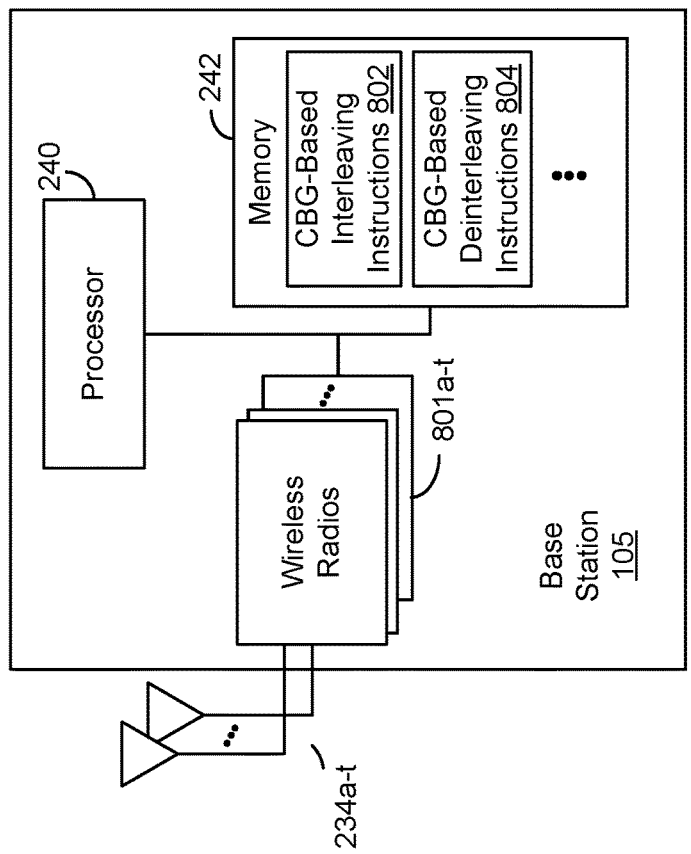
FIG. 8 is a block diagram of an example of a UE according to some aspects of the disclosure.

FIG. 8 is a block diagram illustrating an example of a base station 105 according to some aspects of the disclosure. The base station 105 may include structure, hardware, and components illustrated in FIG. 2. For example, the base station 105 may include the processor 240, which may execute instructions stored in memory 242. Under control of the processor 240, the base station 105 may transmit and receive signals via wireless radios 801a-t and antennas 234a-t. The wireless radios 801a-t may include one or more components or devices described herein, such as the modulator/demodulators 232a-t, the MIMO detector 236, the receive processor 238, the transmit processor 220, the TX MIMO processor 230, the transmitter 306, the receiver 308, one or more other components or devices, or a combination thereof.

In some implementations, the memory 242 stores instructions executable by the processor 240 (or by another component of the base station 105) to initiate, perform, or control one or more operations described herein. For example, in some implementations, the memory 242 may store CBG-based interleaving instructions 802 executable by the processor 240 to interleave the CBs 322, 324 using one or more techniques described herein and to initiate transmission of the CBs 322, 324 after interleaving. Alternatively or in addition, the memory 242 may store CBG-based deinterleaving instructions 804 executable by the processor 240 to deinterleave received CBs, such as CBs received from the UE 115 in connection with an uplink transmission.

According to some further aspects, in a first aspect, an apparatus for wireless communication includes a transmitter and a receiver. The receiver is configured to receive a first CB that is associated with a CBG and that is included in a TB. The receiver is further configured to receive a second CB that is associated with the CBG and that is included in the TB. The first CB is distinct from the second CB. The second CB includes at least a first bit that is associated with the first CB.

In a second aspect alternatively or in addition to the first aspect, the apparatus includes a reorder buffer configured to store the first CB and the second CB and a deinterleaver coupled to the reorder buffer. The deinterleaver is configured to move the first bit from the second CB to the first CB to generate a deinterleaved version of the first CB and to move a second bit associated with the second CB from the first CB to the second CB to generate a deinterleaved version of the second CB.

In a third aspect alternatively or in addition to one or more of the first through second aspects, a storage capacity of the reorder buffer is greater than or equal to a data size associated with the CBG.

In a fourth aspect alternatively or in addition to one or more of the first through third aspects, the TB includes a particular number of interleaved regions that are separately interleaved from one another, and the particular number of interleaved regions corresponds to a number of CBGs associated with the TB.

In a fifth aspect alternatively or in addition to one or more of the first through fourth aspects, the transmitter is configured to transmit a request to enable CBG-based interleaving.

In a sixth aspect alternatively or in addition to one or more of the first through fifth aspects, the receiver is configured to receive one or more CBs prior to the first CB and the second CB, and the request to enable CBG-based interleaving is based on a CRC failure rate associated with the one or more CBs.

In a seventh aspect alternatively or in addition to one or more of the first through sixth aspects, the request corresponds to particular value of a bit that is included in an uplink signal, and the uplink signal includes a measurement report or UCI.

In an eighth aspect alternatively or in addition to one or more of the first through seventh aspects, the receiver is configured to receive a message indicating activation of CBG-based interleaving based on one or more channel estimation parameters.

In a ninth aspect alternatively or in addition to one or more of the first through eighth aspects, the message corresponds to one of a DCI message, a MAC-CE message, or an RRC configuration message.

In a tenth aspect alternatively or in addition to one or more of the first through ninth aspects, the transmitter is configured to transmit an indication of a capability to perform CBG-based interleaving.

In an eleventh aspect alternatively or in addition to one or more of the first through tenth aspects, the transmitter is configured to transmit a HARQ feedback message indicating one of an ACK of the CBG or a NACK of the CBG.

In a twelfth aspect alternatively or in addition to one or more of the first through eleventh aspects, the receiver is configured to receive the TB during operation based on a mode in which CBGs are not configured or not enabled for the TB.

In a thirteenth aspect alternatively or in addition to one or more of the first through twelfth aspects, the receiver is configured to receive control information indicating a location of at least one interleaved region within the TB.

In a fourteenth aspect alternatively or in addition to one or more of the first through thirteenth aspects, the control information is included in one of a DCI message, a MAC-CE message, or an RRC configuration message.

In a fifteenth aspect alternatively or in addition to one or more of the first through fourteenth aspects, the control information indicates a particular location of the at least one interleaved region within the TB relative to a second interleaved region within the TB.

In a sixteenth aspect alternatively or in addition to one or more of the first through fifteenth aspects, the transmitter is configured to transmit an indication of a requested location of the at least one interleaved region within the TB.

In a seventeenth aspect alternatively or in addition to one or more of the first through sixteenth aspects, the indication is included in an uplink signal, and the uplink signal includes a measurement report or in UCI.

In an eighteenth aspect alternatively or in addition to one or more of the first through seventeenth aspects, a method of wireless communication includes receiving a first CB that is associated with a CBG and that is included in a TB. The method further includes receiving a second CB that is associated with the CBG and that is included in the TB. The first CB is distinct from the second CB. The second CB includes at least a first bit that is associated with the first CB.

In a nineteenth aspect alternatively or in addition to one or more of the first through eighteenth aspects, the method includes, after receiving the first CB and the second CB: storing the first CB to a reorder buffer; storing the second CB to the reorder buffer; moving the first bit from the second CB to the first CB using a deinterleaver to generate a deinterleaved version of the first CB; and moving a second bit associated with the second CB from the first CB to the second CB to generate a deinterleaved version of the second CB.

In a twentieth aspect alternatively or in addition to one or more of the first through nineteenth aspects, a storage capacity of the reorder buffer is greater than or equal to a data size associated with the CBG.

In a twenty-first aspect alternatively or in addition to one or more of the first through twentieth aspects, an apparatus for wireless communication includes a receiver and a transmitter. The transmitter is configured to transmit a first CB that is associated with a CBG and that is included in a TB. The transmitter is further configured to transmit a second CB that is associated with the CBG and that is included in the TB. The first CB is distinct from the second CB. The second CB includes at least a first bit that is associated with the first CB.

In a twenty-second aspect alternatively or in addition to one or more of the first through twenty-first aspects, the apparatus includes a reorder buffer configured to store the first CB and the second CB. The apparatus further includes an interleaver coupled to the reorder buffer and configured to move the first bit from the first CB to the second CB to generate an interleaved version of the second CB and to move a second bit associated with the second CB from the second CB to the first CB to generate an interleaved version of the first CB.

In a twenty-third aspect alternatively or in addition to one or more of the first through twenty-second aspects, a storage capacity of the reorder buffer is greater than or equal to a data size associated with the CBG.

In a twenty-fourth aspect alternatively or in addition to one or more of the first through twenty-third aspects, the TB includes a particular number of interleaved regions that are separately interleaved from one another, and the particular number of interleaved regions corresponds to a number of CBGs associated with the TB.

In a twenty-fifth aspect alternatively or in addition to one or more of the first through twenty-fourth aspects, the receiver is configured to receiver a request to enable CBG-based interleaving.

In a twenty-sixth aspect alternatively or in addition to one or more of the first through twenty-fifth aspects, the request corresponds to particular value of a bit that is included in an uplink signal, and the uplink signal includes a measurement report or UCI.

In a twenty-seventh aspect alternatively or in addition to one or more of the first through twenty-sixth aspects, the transmitter is configured to transmit a message indicating activation of CBG-based interleaving based on one or more channel estimation parameters.

In a twenty-eighth aspect alternatively or in addition to one or more of the first through twenty-seventh aspects, a method of wireless communication includes transmitting a first CB that is associated with a CBG and that is included in a TB. The method further includes transmitting a second CB that is associated with the CBG and that is included in the TB. The first CB is distinct from the second CB. The second CB includes at least a first bit that is associated with the first CB.

In a twenty-ninth aspect alternatively or in addition to one or more of the first through twenty-eighth aspects, the method includes, prior to transmitting the first CB and the second CB: storing the first CB to a reorder buffer; storing the second CB to the reorder buffer; moving the first bit from the first CB to the second CB using an interleaver to generate an interleaved version of the second CB; and moving a second bit associated with the second CB from the second CB to the first CB using an interleaver to generate an interleaved version of the first CB.

In a thirtieth aspect alternatively or in addition to one or more of the first through twenty-ninth aspects, a storage capacity of the reorder buffer is greater than or equal to a data size associated with the CBG.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, or modules described herein may include processors, electronics devices, hardware devices, electronics components, logical circuits, memories, software codes, firmware codes, among other examples, or any combination thereof. Software may include instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and operations described herein may be implemented as electronic hardware, computer software, or combinations of both. To illustrate, various illustrative components, blocks, modules, circuits, and operations have been described generally. Whether such functionality is implemented as hardware or software may depend upon the particular application and parameters of the overall system. Skilled artisans may implement the described functionality in varying ways for each particular application, but such implementation decisions should not be interpreted as causing a departure from the scope of the disclosure. Skilled artisans will also readily recognize that the order or combination of components, methods, or interactions that are described herein are examples and that the components, methods, or interactions of the various aspects of the disclosure may be combined or performed in ways other than those illustrated and described herein.

A hardware and data processing apparatus used to implement the various illustrative logics, logical blocks, modules, and circuits described herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform one or more functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In some aspects, one or more functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, or one or more modules of computer program instructions, encoded on a computer storage media for execution by, or to control the operation of, a data processing apparatus.

If implemented in software, the functions may be stored on a computer-readable medium. A processor or method described herein may be implemented in a processor-executable software module which may reside on a computer-readable medium. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or process may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, the apparatus comprising:
   a transmitter; and
   a receiver configured to receive a first code block (CB) that is associated with a code block group (CBG) and that is included in a transport block (TB) and further configured to receive a second CB that is associated with the CBG and that is included in the TB, wherein the first CB is distinct from the second CB, and wherein the second CB includes at least a first bit that is associated with the first CB.

2. The apparatus of claim 1, further comprising:
   a reorder buffer configured to store the first CB and the second CB; and
   a deinterleaver coupled to the reorder buffer and configured to move the first bit from the second CB to the first CB to generate a deinterleaved version of the first CB and further configured to move a second bit associated with the second CB from the first CB to the second CB to generate a deinterleaved version of the second CB.

3. The apparatus of claim 2, wherein a storage capacity of the reorder buffer is greater than or equal to a data size associated with the CBG.

4. The apparatus of claim 1, wherein the TB includes a particular number of interleaved regions that are separately interleaved from one another, and wherein the particular number of interleaved regions corresponds to a number of CBGs associated with the TB.

5. The apparatus of claim 1, wherein the transmitter is configured to transmit a request to enable CBG-based interleaving.

6. The apparatus of claim 5, wherein the receiver is further configured to receive one or more CBs prior to the first CB and the second CB, and wherein the request to enable CBG-based interleaving is based on a cyclic redundancy check (CRC) failure rate associated with the one or more CBs.

7. The apparatus of claim 5, wherein the request corresponds to particular value of a bit that is included in an uplink signal, and wherein the uplink signal includes a measurement report or uplink control information (UCI).

8. The apparatus of claim 1, wherein the receiver is further configured to receive a message indicating activation of CBG-based interleaving based on one or more channel estimation parameters.

9. The apparatus of claim 8, wherein the message corresponds to one of a downlink control information (DCI) message, a medium access control (MAC) control element (MAC-CE) message, or a radio resource control (RRC) configuration message.

10. The apparatus of claim 1, wherein the transmitter is configured to transmit an indication of a capability to perform CBG-based interleaving.

11. The apparatus of claim 1, wherein the transmitter is configured to transmit a hybrid automatic repeat request (HARQ) feedback message indicating one of an acknowledgement (ACK) of the CBG or a non-acknowledgement (NACK) of the CBG.

12. The apparatus of claim 1, wherein the receiver is further configured to receive the TB during operation based on a mode in which CBGs are not configured or not enabled for the TB.

13. The apparatus of claim 12, wherein the receiver is further configured to receive control information indicating a location of at least one interleaved region within the TB.

14. The apparatus of claim 13, wherein the control information is included in one of a downlink control information (DCI) message, a medium access control (MAC) control element (MAC-CE) message, or a radio resource control (RRC) configuration message.

15. The apparatus of claim 13, wherein the control information indicates a particular location of the at least one interleaved region within the TB relative to a second interleaved region within the TB.

16. The apparatus of claim 13, wherein the transmitter is configured to transmit an indication of a requested location of the at least one interleaved region within the TB.

17. The apparatus of claim 16, wherein the indication is included in an uplink signal, and wherein the uplink signal includes a measurement report or in uplink control information (UCI).

18. A method of wireless communication, the method comprising:
    receiving a first code block (CB) that is associated with a code block group (CBG) and that is included in a transport block (TB); and
    receiving a second CB that is associated with the CBG and that is included in the TB, wherein the first CB is distinct from the second CB, and wherein the second CB includes at least a first bit that is associated with the first CB.

19. The method of claim 18, further comprising:
    after receiving the first CB and the second CB:
        storing the first CB to a reorder buffer;
        storing the second CB to the reorder buffer;
        moving the first bit from the second CB to the first CB using a deinterleaver to generate a deinterleaved version of the first CB; and
        moving a second bit associated with the second CB from the first CB to the second CB to generate a deinterleaved version of the second CB.

20. The method of claim 19, wherein a storage capacity of the reorder buffer is greater than or equal to a data size associated with the CBG.

21. An apparatus for wireless communication, the apparatus comprising:
    a receiver; and
    a transmitter configured to transmit a first code block (CB) that is associated with a code block group (CBG) and that is included in a transport block (TB) and further configured to transmit a second CB that is associated with the CBG and that is included in the TB, wherein the first CB is distinct from the second CB, and wherein the second CB includes at least a first bit that is associated with the first CB.

22. The apparatus of claim 21, further comprising:
    a reorder buffer configured to store the first CB and the second CB; and
    an interleaver coupled to the reorder buffer and configured to move the first bit from the first CB to the second CB to generate an interleaved version of the second CB and further configured to move a second bit associated with the second CB from the second CB to the first CB to generate an interleaved version of the first CB.

23. The apparatus of claim 22, wherein a storage capacity of the reorder buffer is greater than or equal to a data size associated with the CBG.

24. The apparatus of claim 21, wherein the TB includes a particular number of interleaved regions that are separately interleaved from one another, and wherein the particular number of interleaved regions corresponds to a number of CBGs associated with the TB.

25. The apparatus of claim 21, wherein the receiver is configured to receiver a request to enable CBG-based interleaving.

26. The apparatus of claim 25, wherein the request corresponds to particular value of a bit that is included in an uplink signal, and wherein the uplink signal includes a measurement report or uplink control information (UCI).

27. The apparatus of claim 21, wherein the transmitter is further configured to transmit a message indicating activation of CBG-based interleaving based on one or more channel estimation parameters.

28. A method of wireless communication, the method comprising:
    transmitting a first code block (CB) that is associated with a code block group (CBG) and that is included in a transport block (TB); and
    transmitting a second CB that is associated with the CBG and that is included in the TB, wherein the first CB is distinct from the second CB, and wherein the second CB includes at least a first bit that is associated with the first CB.

29. The method of claim 28, further comprising:
    prior to transmitting the first CB and the second CB:
        storing the first CB to a reorder buffer;
        storing the second CB to the reorder buffer;
        moving the first bit from the first CB to the second CB using an interleaver to generate an interleaved version of the second CB; and
        moving a second bit associated with the second CB from the second CB to the first CB using an interleaver to generate an interleaved version of the first CB.

30. The method of claim 29, wherein a storage capacity of the reorder buffer is greater than or equal to a data size associated with the CBG.

* * * * *